United States Patent Office 2,778,841
Patented Jan. 22, 1957

2,778,841

11-HYDROXYTESTOSTERONE, 11-HYDROXY-19-NORTESTOSTERONE AND THEIR PRODUCTION

Jack W. Ralls, Morton Grove, Ill., assignor, by mesne assignments, to G. D. Searle & Co., Skokie, Ill., a corporation of Delaware No Drawing. Application December 21, 1953, Serial No. 399,631

8 Claims. (Cl. 260—397.45)

This application relates to 11-hydroxytestosterone and 11-hydroxy-19-nortestosterone and to their production. The compounds which constitute my invention have the general structural formula

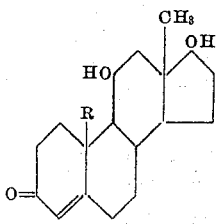

wherein R is either a hydrogen or a methyl radical. These compounds can be produced by reducing the corresponding 17-oxo compounds of the structural formula

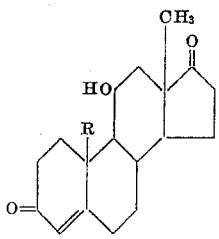

preferably by reaction with an aluminum alkoxide such as aluminum t-butoxide in the presence of a secondary lower alcohol. This reagent affects only the 17-oxo group and leaves the 3-oxo group intact. Other suitable catalysts include aluminum t-amyloxide and aluminum isopropoxide. Other suitable secondary alcohols include 2-propanol, 2-pentanol and cyclohexanol. Hydrocarbons such as benzene or toluene are preferred solvents.

The claimed compounds are novel steroids which are useful by reason of their anabolic and adrenal hormone activity. They are also useful as intermediates in the preparation of adrenal cortex hormones. Further the 19-nor-compound produces estrogenic effects.

The following examples illustrate in further detail the compounds which constitute this invention and methods for their preparation. However, the invention is not to be construed as limited in spirit or in scope by the details set forth.

Example 1

A suspension of 100.8 milligrams of 11β-hydroxy-4-androstene-3,17-dione in 10.0 milliliters of dry benzene and 1.0 ml. of 2-butanol was heated and distilled until 2.5 ml. of distillate had been collected. Then 74 mg. of aluminum t-butoxide was added and the mixture heated under reflux for seven hours. The pale yellow reaction mixture was cooled and 30 ml. of 5% sodium hydroxide solution was added. The mixture was shaken vigorously to decompose the aluminum compounds. The mixture was diluted with benzene, shaken in a separatory funnel, and the layers separated. The benzene extract was washed with 5% sodium hydroxide solution and water. The colorless benzene solution was dried over anhydrous sodium sulfate and evaporated. The partially crystalline solid residue weighed 60.4 mg. Crystallization from ethyl acetate gave crude 11β-hydroxy-testosterone, M. P. 232–240° C. Another crystallization afforded pure 11β-hydroxytestosterone melting at 241–242.5° C. This material has a rotation, $[\alpha]_D^{25}=157°$ in chloroform. The ultraviolet absorption spectrum of this compound exhibits a principal maximum ($\gamma_{max}$) at 2420 A. in methanol. The molecular extinction coefficient ($\epsilon$) is 17,500 and log $\epsilon = 4.24$.

The structure of 11-hydroxytestosterone has been confirmed by its conversion to adrenosterone by oxidation as follows:

27.0 mg. of 11β-hydroxytestoserone dissolved in 2 ml. of acetic acid was treated with 0.67 ml. of chromic anhydride solution (33 mg. of $CrO_3$ per ml.) and maintained at 6–8° C. for 5 hours. Then 1.0 ml. of ethanol was added to destroy excess oxidizing agent and the reaction mixture was poured into cold water and extracted with chloroform. The chloroform extract was dried and evaporated, yielding 26.7 mg. of adrenosterone melting at 192–210° C. After recrystallization from ethanol it melts at 224–227° C. The mixed melting point with an authentic sample of adrenosterone was 223–226° C.

Example 2

A mixture of 48 mg. of 11β-hydroxy-19-nor-4-androstene-3,17-dione in 5 ml. of dry benzene and 0.5 ml. of 2-butanol was heated and distilled until 1.25 ml. of distillate had been collected. Then 37 mg. of aluminum t-butoxide were added and the mixture was heated at reflux temperature for 5 hours. After cooling, the reaction mixture was treated with 15 ml. of a 5% sodium hydroxide solution and agitated to decompose the aluminum compounds. The mixture was then extracted with benzene and the extract was washed with 5% sodium hydroxide solution and water, dried over anhydrous sodium sulfate and evaporated. On crystallization from ethyl acetate, pure 11β-hydroxy-19-nortestosterone was obtained melting at about 224–227° C. The ultraviolet absorption spectrum shows a maximum at 243 millimicrons and a molecular extinction coefficient of 16,100. An 0.36% chloroform solution shows a rotation of $[\alpha]_D^{25}=720$.

Oxidation with chromic anyhydride by the method of the preceding example, yields 19-noradrenosterone which, crystallized from methanol, melts at about 212–215° C.

The starting material 11β-hydroxy-19-nor-4-androstene-3,17-dione used in this example is obtained from 17β-estradiol-3-methyl ether according to the method described by Frank B. Colton in U. S. 2,655,518 issued October 13, 1953 and Leland J. Chinn in copending application Serial No. 361,069, filed June 11, 1953.

Thus, in Example 1 of U. S. 2,655,518 is described the conversion of 17β-estradiol 3-methyl ether to 3-methoxy - 13 - methyl - 1,4,6,7,8,9,11,12,13,14,16,17-dodecahydro - 5H - cyclopenta[α]phenanthrene - 17β - ol and the oxidation of this compound to the corresponding 17-keto derivative. Hydrolysis of the dione with dilute mineral acids yields 13-methyl-1,2,3,6,7,8,9,10,11,12,13,-14,16,17 - tetradecahydro-15H-cyclopent[α]phenanthrene-3,17-dione which on perfusion through a surviving mammalian adrenal gland according to Example 2 of the Chinn application, Serial No. 361,069, is converted to 11β - hydroxy - 13 - methyl-1,2,3,6,7,8,9,10,11,12,13,14,-16,17 - tetradecahydro - 15H-cyclopenta[α]phenanthrene-3,17-dione which is the starting material used herein and referred to by the more specific name 11β-hydroxy-19-nor-4-androstene-3,17-dione.

I claim:
1. An 11β-hydroxysteroid having the formula

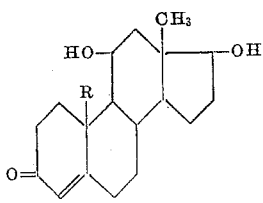

wherein R is a member of the group consisting of hydrogen and methyl.
2. 11β-hydroxytestosterone.
3. 11β-hydroxy-19-nortestosterone.
4. The method of producing a compound of the structural formula

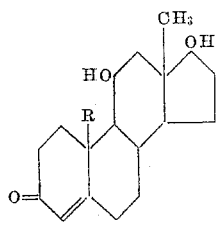

wherein R is a member of the class consisting of hydrogen and methyl, which comprises reacting a compound of the structural fromula

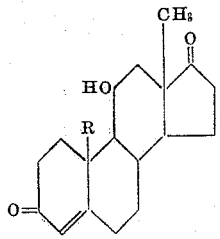

with an aluminum lower alkoxide in a lower secondary alcohol and isolating the product thus formed.
5. The method of producing 11-hydroxy-19-nor-testosterone which comprises reacting 11-hydroxy-19-nor-4-androstene-3,17-dione with an aluminum lower alkoxide in a lower secondary alcohol and isolating the product thus formed.
6. The method of producing 11-hydroxy-19-nortestosterone which comprises reacting 11-hydroxy-19-nor-4-androstene-3,17-dione with aluminum t-butoxide in 2-butanol and isolating the product thus formed.
7. The method of producing 11-hydroxytestosterone which comprises reacting 11-hydroxy-4-androstene-3,17-dione with an aluminum lower alkoxide in a lower secondary alcohol and isolating the product thus formed.
8. The method of producing 11-hydroxytestosterone which comprises reacting 11-hydroxy-4-androstene-3,17-dione with aluminum t-butoxide in 2-butanol and isolating the product thus formed.

No references cited.